United States Patent
Altekruse

(10) Patent No.: US 6,225,599 B1
(45) Date of Patent: May 1, 2001

(54) MIG GUN WITH AXIALLY ALIGNED OFFSET MOTOR

(75) Inventor: Kenneth C. Altekruse, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/317,505

(22) Filed: May 24, 1999

(51) Int. Cl.[7] .................................................. B23K 9/173
(52) U.S. Cl. ............................ 219/137.31; 219/137.61; 219/137.7
(58) Field of Search ........................ 219/137.61, 137.31, 219/137.62, 137.63, 136, 137.42, 137.2, 137.7, 137.44, 74, 75

(56) References Cited

U.S. PATENT DOCUMENTS

| | | | |
|---|---|---|---|
| 2,544,801 | * 3/1951 | Muller et al. | 219/137.44 |
| 2,761,049 | * 8/1956 | McElrath et al. | 219/137.62 |
| 3,261,962 | * 7/1966 | Carkhuff et al. | 219/75 |
| 3,424,012 | 1/1969 | Hirmann | 74/25 |
| 3,738,555 | 6/1973 | Karnes et al. | 226/168 |
| 3,744,694 | 7/1973 | Karnes et al. | 226/168 |
| 4,049,172 | 9/1977 | Samokovliski et al. | 226/90 |
| 4,080,880 | 3/1978 | Shikaya | 93/94 |
| 4,845,336 | * 7/1989 | Samokovliiski et al. | 219/137.62 |
| 5,132,513 | * 7/1992 | Ingwersen et al. | 219/137.31 |
| 5,313,046 | 5/1994 | Zamuner | 219/137.62 |
| 5,384,447 | 1/1995 | Raloff | 219/137 |
| 5,427,295 | 6/1995 | David | 226/180 |
| 5,571,431 | 11/1996 | Lantieri | 219/130.01 |
| 5,595,671 | * 1/1997 | David | 219/137.62 |
| 5,728,995 | 3/1998 | Kensrue | 219/137.31 |
| 6,025,574 | * 2/2000 | Colangelo, Jr. | 219/137.31 |

* cited by examiner

*Primary Examiner*—Clifford C. Shaw
(74) *Attorney, Agent, or Firm*—John H. Pilarski; Mark W. Croll; John P. O'Brien

(57) ABSTRACT

A mig welding gun handle is in two sections that are offset from each other by an angle of approximately 20 degrees. The offset handle makes the gun exceptionally comfortable for an operator to maneuver when welding various workpieces. A non-right angle gear set in which the pinion axial centerline intersects the gear axis of rotation at an angle of approximately 70 degrees makes the offset handle possible. The gun further comprises a gas seal that blocks atmospheric air in the weld wire liner from reaching the welding arc. The gas seal comprises a passage that bleeds inert gas to the interior of the liner. The relatively high pressure of the inert gas in the liner interior blocks atmospheric air from flowing through the hole in the contact tip to the arc.

27 Claims, 4 Drawing Sheets

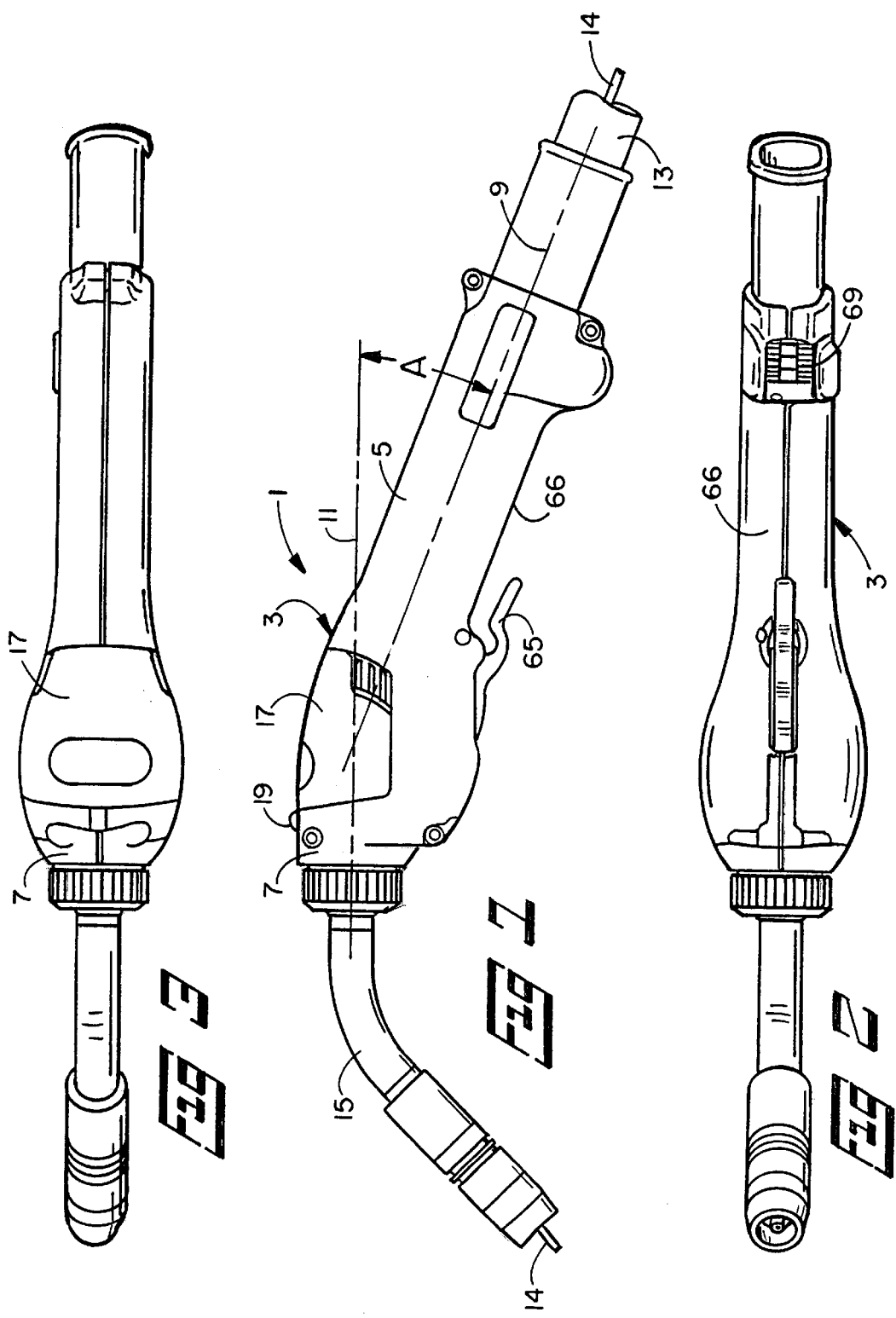

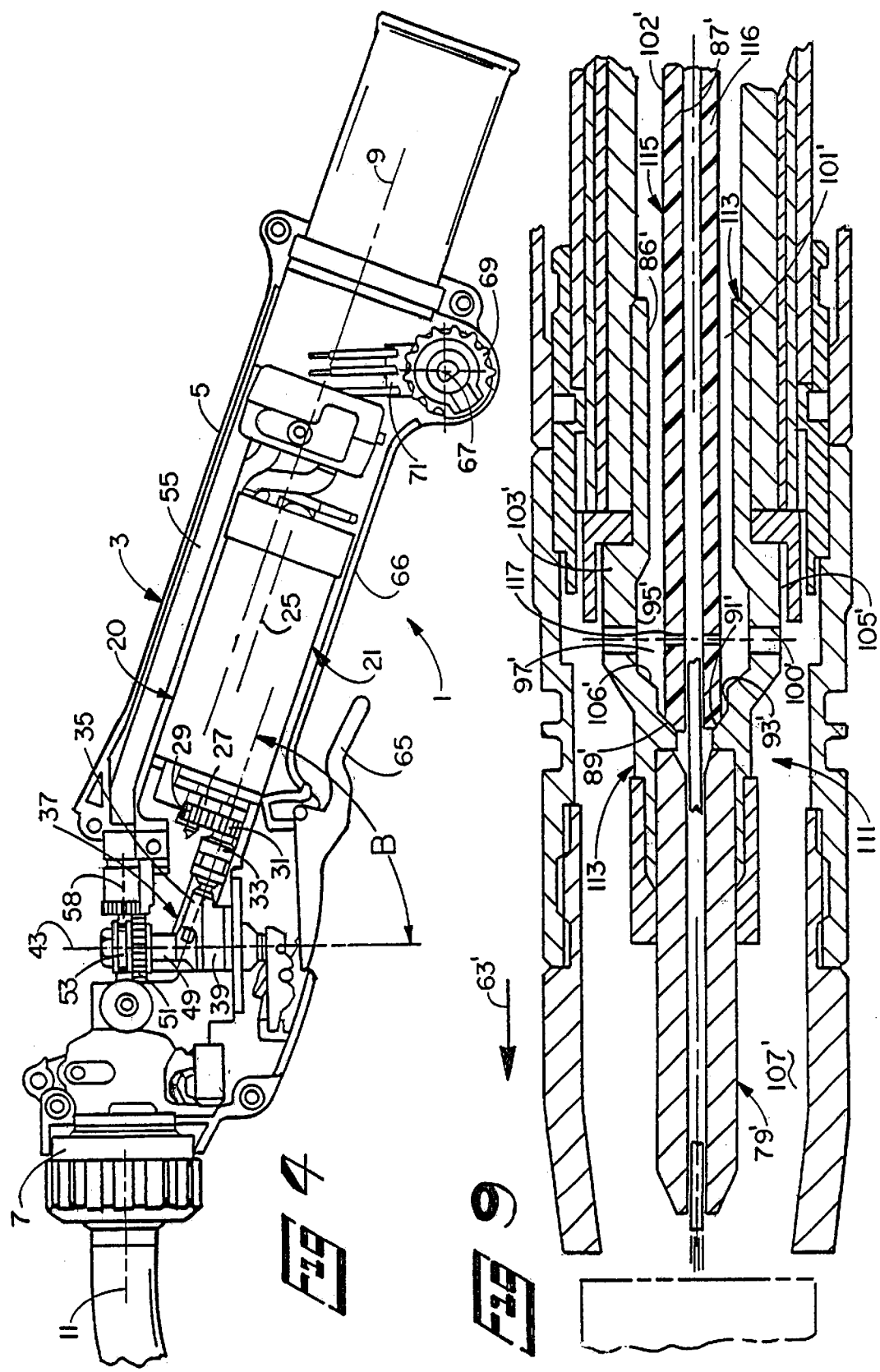

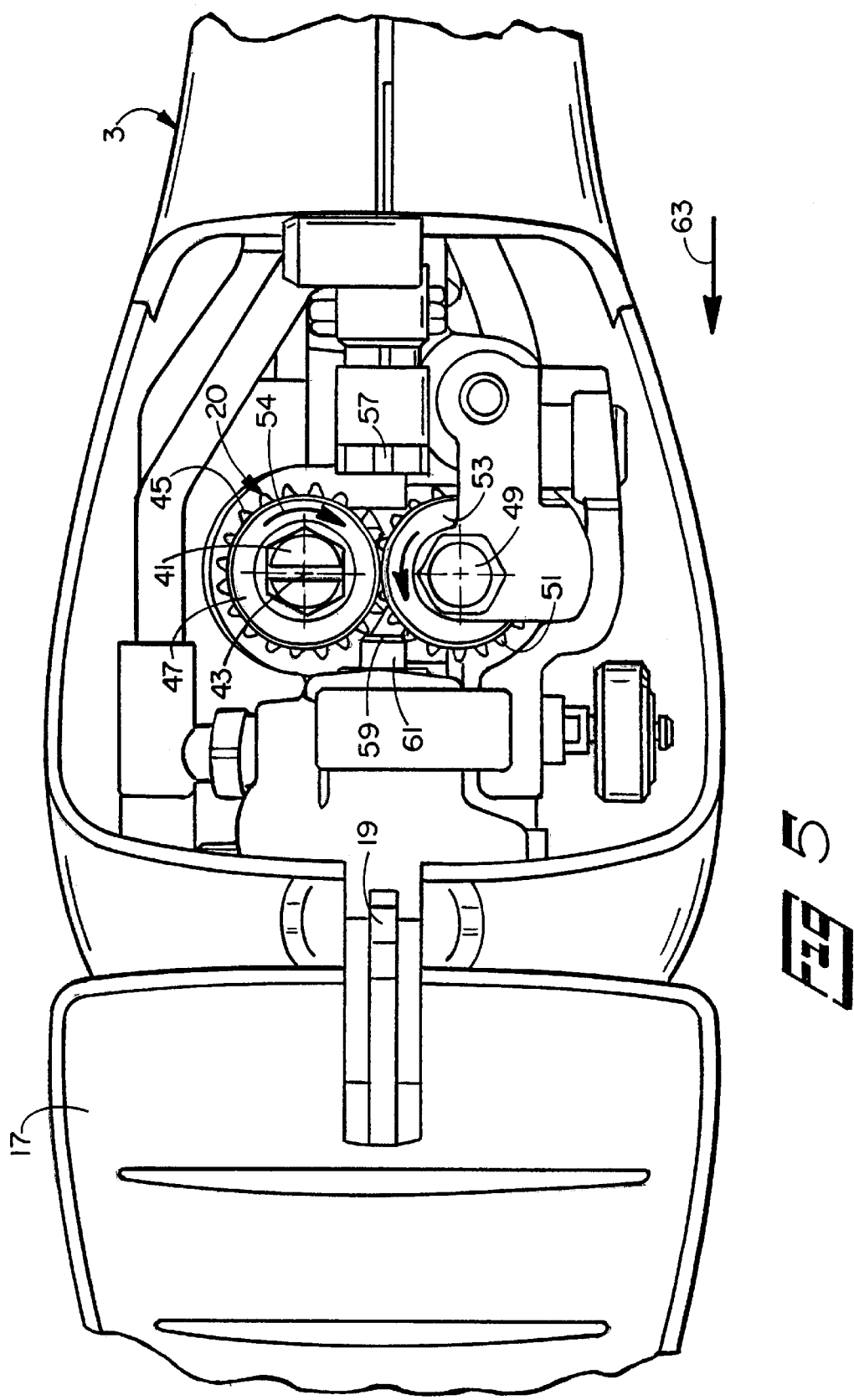

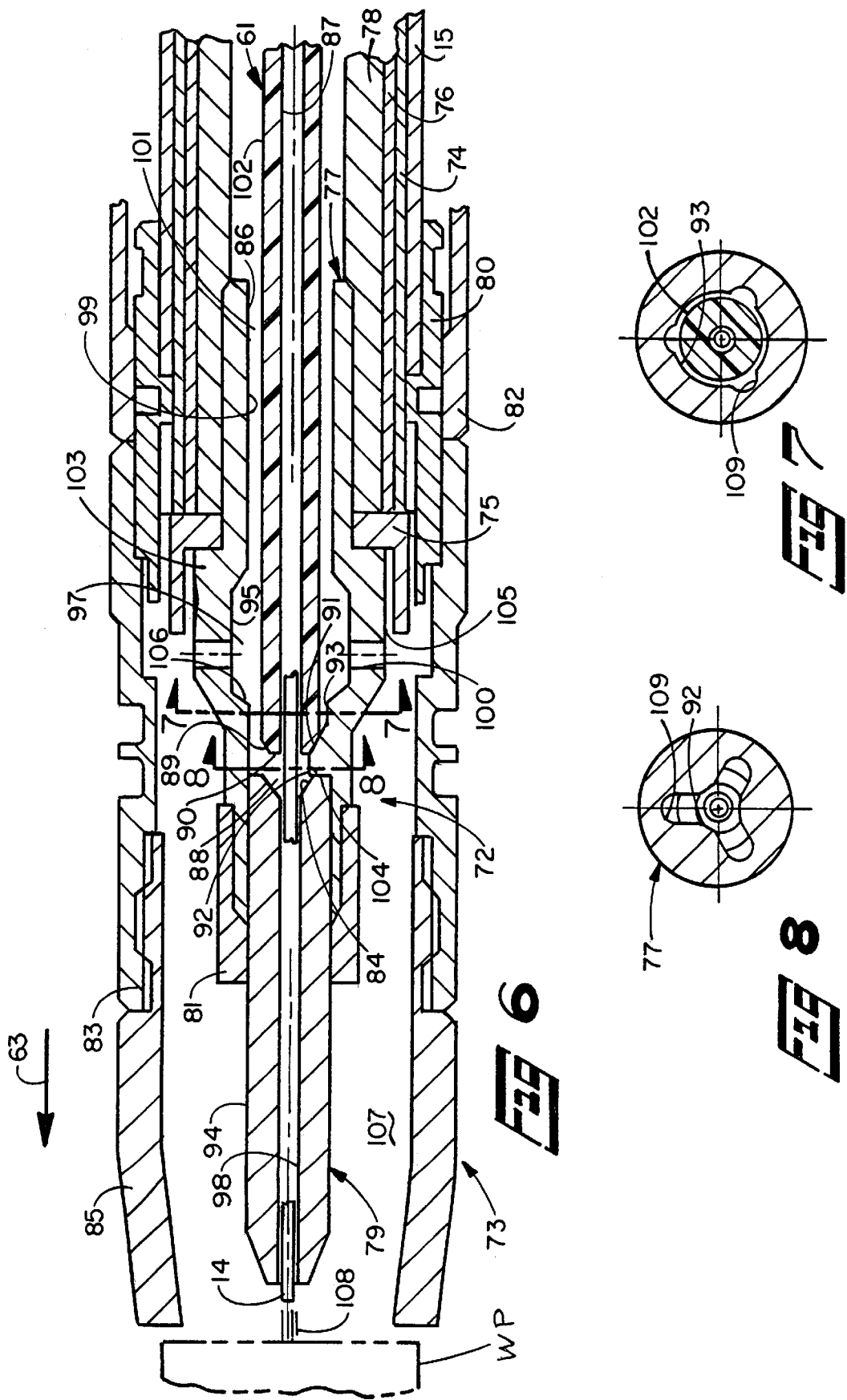

MIG GUN WITH AXIALLY ALIGNED OFFSET MOTOR

BACKGROUND OF THE INVENTION

1. Field of the Invention

This invention pertains to gas metal arc welding (GMAW), and more particularly to guns used in mig welding.

2. Description of the Prior Art

Mig guns must perform several different functions in order for successful welding to occur. Those functions include directing the weld wire to the workpiece, conducting electric power to the weld wire, and shielding the welding arc from atmospheric air. In addition to the foregoing basic requirements, it is highly desirable that the weld wire be fed to the workpiece at an adjustable rate that suits the particular welding operation at hand. For maximum productivity, it is also necessary that the gun be very comfortable for the operator to maneuver as he directs the weld wire to the workpiece.

To satisfy the foregoing requirements, the gun is connected by a long flexible cable to a wire feeder, which is in close proximity to a welding machine. The welding machine supplies the weld wire, electric power, cooling fluid, and inert shielding gas through the cable to the gun. In some instances, the cable may be as long as 30 feet. Small diameter aluminum weld wire, as is typically used when welding aluminum workpieces, has insufficient column strength to be satisfactorily pushed for such long distances to the gun. Accordingly, it is known to provide mig guns with a feed mechanism that pulls the weld wire at the same time the wire feeder attached to the welding machine is pushing the weld wire.

The gun feed mechanism is contained in a handle that is held by the operator. There is a head tube on the end of the handle opposite the flexible cable. A diffuser is joined to the free end of the head tube. A contact tip is connected to the diffuser. The weld wire is guided by a liner that extends from the handle to the diffuser. From the diffuser, the weld wire passes through the contact tip, from which it emerges under the impetus of the feed mechanism.

An example of a prior mig gun is manufactured by M. K. Products, Inc., of Irvine, Calif., under the trademark Cobra. That gun has a long straight handle that contains a weld wire feed mechanism. The feed mechanism includes a motor having an axial center line inside and parallel to the handle longitudinal axis. The motor drives a feed roller that, in conjunction with an undriven idler roll, pulls the weld wire from the wire feeder of the welding machine. The axes of rotation of the feed rollers are perpendicular to the motor axial center line. The gun feed mechanism is adjustable by a non-graduated knob on a side of the handle. The non-graduated knob enables the operator to control the weld wire feed rate through a range from zero to a maximum over three turns of the knob.

The prior Cobra gun has two disadvantages. First, the straight handle makes the gun rather cumbersome to maneuver by the operator through the multiplicity of spacial positions encountered when welding various workpieces. Second, the weld wire feed control knob is located where it is awkward to adjust by a left-handed operator and, being non-graduated, it is almost impossible to determine the preset position. The operator must either transfer the gun to his right hand to adjust the knob, or he must turn the gun in his left hand so the knob is accessible to his right hand.

An example of another prior mig gun with a weld wire feed mechanism may be seen in U.S. Pat. No. 5,728,995. The gun of that patent is in the general configuration of a pistol. The operator holds an electric motor that is at a right angle to the longitudinal axis of the gun. The motor axial centerline is parallel to the axes of rotation of feed rollers that pull the weld wire. A head tube curves away from the handle at the handle downstream end. The pistol-type gun is also awkward to maneuver into some of the numerous spacial positions encountered in welding operations.

As mentioned, it is vital that the mig gun adequately shield the welding arc from the atmosphere. For that purpose, inert gas is supplied to prior guns from the welding machine through the flexible cable. The inert gas is directed through the gun head tube to the interior of the diffuser. The gas flows from the diffuser to a nozzle that surrounds the contact tip. The gas then flows out the nozzle and surrounds the contact tip and the weld wire emerging from it. The gas thus shields the weld wire and the welding arc from the atmosphere.

Despite the widespread use and general acceptance of the prior designs of diffusers and nozzles, they nevertheless are not completely acceptable. Specifically, a sooty deposit has been noticed from some welding operations on aluminum workpieces that use aluminum weld wire. The soot is carbon residue produced in the welding arc. The source of the carbon is a boundary layer of air that surrounds the weld wire inside the clearance holes in the liner and the contact tip. Although the spaces between the weld wire and the liner and contact tip clearance holes are very small, they nevertheless are sufficient to enable some air to pass inside the inert gas shield from the nozzle and thus be present at the welding arc.

Accordingly, it is desirable that improvements be made to GMAW guns.

SUMMARY OF THE INVENTION

In accordance with the present invention, a mig gun with an offset handle and a gas seal provides superior maneuverability and performance compared with prior guns. This is accomplished by apparatus that includes a motor with an axial centerline that makes an acute angle with the axes of rotation of weld wire feed rollers.

The motor is part of a feed mechanism that pulls a weld wire from a welding machine. The motor is supported in and is parallel to the longitudinal axis of a first section of the gun handle. On the motor armature is a pinion of a non-right angle gear set. The pinion meshes with a gear of the gear set. The gear is connected to a first shaft mounted for rotation in the gun handle. The axis of rotation of the first shaft and of the gear makes the acute angle with the axial centerline of the motor armature. In one embodiment, a first feed roller is fixed to the first shaft. A second feed roller is fixed to a second shaft. Gears on the first and second shafts mesh with each other. Energization of the motor causes the feed rollers to rotate in opposite directions and pull the weld wire.

The gun handle has a second section with a second longitudinal axis that is perpendicular to the axes of rotation of the two feed rollers. The longitudinal axis of the handle second section intersects the longitudinal axis of the handle first section at an angle that is the complement of the angle between the motor axial centerline and the axes of rotation of the feed rollers. For example, if the motor axial centerline intersects the feed rollers axes of rotation at 70 degrees, the longitudinal axes of the handle first and second sections intersect at 20 degrees.

The weld wire is directed in a downstream direction through a flexible cable between the welding machine and the gun. The weld wire passes inside a guide in the handle to the feed rollers. The guide bends at the junction between the handle first and second sections so as to follow the two longitudinal axes of the handle. A curved head tube projects from the handle second section. The weld wire emerges from the head tube to contact the workpiece. The offset handle increases the comfort of the operator's hand and wrist as he maneuvers the gun through a wide range of spacial positions while welding different workpieces.

It is a feature of the present invention that the speed of the motor, and thus the rate of weld wire fed by the feed mechanism rollers, is controlled from a central location on the gun. For that purpose, there is a small thumbwheel on the center of the gun handle near the flexible cable. The thumbwheel rotates about an axis that may be perpendicular to the motor axial centerline. The thumbwheel is connected to a potentiometer that is part of the electric circuit that controls the speed of the motor such that turning the thumbwheel controls the speed of the motor. A small part of the thumbwheel protrudes through an opening in the underside of the handle. The thumbwheel is not covered by the operator's hand, regardless of which hand is holding the gun. Consequently, the operator can easily reach the thumbwheel with his free hand; he does not have to switch hands to gain access to the thumbwheel. Turning the knob varies the weld wire feed rate relative to a set maximum feed rate set at the welding machine for that welding condition.

Further in accordance with the present invention, the mig gun includes a gas seal in the head tube that blocks atmospheric air from reaching the welding arc along the weld wire. As in prior guns, the weld wire passes from the feed mechanism through the interior of a liner to a diffuser. From the diffuser, the weld wire passes through a hole in a contact tip to the workpiece. An inert gas supplied by the welding machine is directed through the gun handle and into the head tube to a chamber in the diffuser. The great majority of the inert gas flows from the diffuser into a nozzle that surrounds the contact tip. The gas flows out the nozzle to surround the weld wire where it emerges from the contact tip. The gas shields the welding arc from atmospheric air.

In the gas seal of the invention, a small amount of the inert gas bleeds from the diffuser to communicate with the interior of the liner. The inert gas in the liner interior prevents atmospheric air from flowing through the liner interior to the hole in the contact tip and to the welding arc.

In one embodiment of the gas seal of the invention, there is a short length of weld wire between the liner and the contact tip that is unsupported. A small sealing space surrounds the unsupported length of the weld wire. The inert gas flows through a passage from the diffuser to the sealing space. The inert gas fills the sealing space and comes in direct contact with the unsupported length of weld wire. The inert gas has sufficient pressure to flow back upstream into the liner interior. The gas thus blocks any atmospheric air that is present in the liner interior from flowing into the sealing space. Some of the gas in the sealing space also flows in the downstream direction into the contact tip hole. That action further contributes to assure that no air reaches the weld arc. The result is substantially carbon-free welds and minimal carbon deposits on the workpiece around the welds.

In another embodiment of the gas seal, one or more radial holes is formed through the liner wall. Some of the inert gas in the diffuser chamber bleeds through the liner radial holes to the liner interior. The pressure of the inert gas in the liner interior blocks any atmospheric air there from flowing downstream into the contact tip and to the welding arc.

Other advantages, benefits, and features of the present invention will become apparent to those skilled in the art upon reading the detailed description of the invention.

BRIEF DESCRIPTION OF THE DRAWINGS

FIG. 1 is a front view of the mig gun with an axially aligned offset motor of the invention.

FIG. 2 is a bottom view of FIG. 1.

FIG. 3 is a top view of FIG. 1.

FIG. 4 is a broken front view on an enlarged scale of a portion of the mig gun of the invention.

FIG. 5 is a top view on an enlarged scale of FIG. 4.

FIG. 6 is a longitudinal cross-sectional view through the gas seal of the mig gun of the invention.

FIG. 7 is a cross-sectional view taken along line 7—7 of FIG. 6.

FIG. 8 is a cross-sectional view taken along line 8—8 of FIG. 6.

FIG. 9 is a view generally similar to FIG. 6, but showing a modified embodiment of the gas seal of the invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring first to FIGS. 1–5, a mig gun 1 is illustrated that includes the present invention. The gun 1 is particularly useful in carrying out gas metal arc welding (GMAW). However, certain features of the gun are also applicable to other types of welding processes.

The gun 1 is comprised of a handle 3 having a first section 5 and a second section 7. The gun first section 5 has a first longitudinal axis 9. The handle second section 7 has a second longitudinal axis 11. The two axes 9 and 11 intersect at an acute angle A.

A head tube 15 projects from the handle second section 7. A long flexible cable 13 is connected from the handle first section 5 and extends to a welding machine, not shown. The cable 13 guides a weld wire 14 from the welding machine to the gun 1. The cable 13 also contains electric power wires, both welding power and electrical control power for the trigger, potentiometer, and motor, and passages for an inert gas and cooling fluid, as is known in the art. A door 17 is hinged to the handle second section 7 by a hinge 19. Opening the door 17 provides access to the interior of the handle 3.

To pull the weld wire 14 from the welding machine, the gun 1 includes a wire feed mechanism 20. In the illustrated construction, the wire feed mechanism 20 comprises a small variable speed electric motor 21 in the handle first section 5. The motor 21 has an armature 27 with an axial centerline 25 that is parallel to the longitudinal axis 9 of the handle first section. On the armature 27 is a driving gear 29. Meshing with the driving gear 29 is a driven gear 31. The driven gear 31 is fastened to a shaft 33. The shaft 33 is supported for rotation in bearings that are part of the wire feed mechanism 20 inside the gun handle 3.

Also on the shaft 33 is the pinion 35 of a non-right angle gear set 37, such as a helicon gear set. The gear 39 of the helicon gear set 37 is fastened to a shaft 41. A 24:1 reduction of the helicon gear set is one preferred embodiment. The shaft 41 rotates about an axis of rotation 43 in bearings that are part of the wire feed mechanism 20 inside the handle 3. The axis of rotation 43 makes an angle B with the motor axial centerline 25. The angle B is the complement of the angle A between the handle longitudinal axes 9 and 11. The axis of rotation 43 is thus perpendicular to the longitudinal axis 11 of the handle second section 7. On the shaft 41 is a gear 45. Also fixed to the shaft 41 is a first feed roller 47.

The wire feed mechanism 20 inside the handle 3 also rotatably supports a shaft 49 that is parallel to the shaft 41. On the shaft 49 is a gear 51 that meshes with the gear 45. A second feed roller 53 is also on the shaft 49 for rotation therewith. Energizing the motor 21 causes the feed rollers 47 and 53 to rotate at the same speed in the directions of the arrows 54 shown in FIG. 5.

The weld wire 14 passes from the cable 13 into a long guide 55. Most of the guide 55 is parallel to the axis 9 of the handle first section 5. The guide bends at the angle A and terminates in an outlet 57 adjacent the feed rollers 47 and 53. Specifically, the guide outlet 57 has a longitudinal axis 58 that is preferably concentric with the longitudinal axis 11 of the handle second section 7. On the opposite side of the feed rollers of the guide outlet 57 is the inlet end 59 of a hollow liner 61. The liner 61 extends through the handle second section 7 and into the head tube 15, as will be explained in detail shortly. The portion of the liner that is within the handle second section is preferably concentric with the longitudinal axis 11 of the handle second section. The weld wire 14 passes from the outlet 57 of the guide 55, between the feed rollers 47 and 53, and into the liner 61. It is thus seen that energizing the motor 21 pulls the weld wire in a downstream direction 63 through the flexible cable by means of the feed rollers and pushes the weld wire into the liner 61.

The motor 21 is energized by means of a trigger 65 on the underside 66 of the handle 3. The trigger 65 actuates an on-off switch, not shown, for the motor. The trigger 65 is operable by the index finger of a person holding the gun handle first section 5.

The gun 1 is exceptionally comfortable and convenient to maneuver. The angle A between the gun first and second sections 5 and 7, respectively, provides increased flexibility and range of wrist motions for the operator as he maneuvers the gun to suit the many different spacial orientations required for different workpieces. An angle A of between approximately 15 degree and 25 degrees works very well, with an angle of approximately 20 degrees being preferred. The offset angle is made possible by the helicon gear set 37. The particular location of the helicon gear set in the handle 3 has the further advantage of minimizing the distance the weld wire 14 must be pushed before it reaches the workpiece.

It is an important feature of the invention that the speed of the motor 21 is controlled from a very convenient location on the gun 1. Reference numeral 69 represents a thumbwheel that is rotatable in the gun handle 3. It is an important feature of the invention that the thumbwheel 69 protrudes from the center of the underside 66 of the handle proximate the cable 13. The thumbwheel 69 rotates about an axis 67, which, in the particular embodiment shown, is perpendicular to the motor axial centerline 25. A potentiometer 71 connected to the thumbwheel is part of the electric circuit that also includes the motor on-off switch actuated by the trigger 65. Rotating the thumbwheel changes the feed rate in the weld wire 14. Because the thumbwheel is in the center of the handle underside 66, the operator can rotate the thumbwheel with the hand that is not holding the gun. That is, he can adjust the thumbwheel while welding without releasing his grip on the gun. That is the case whether he holds the gun with his right hand or with his left hand.

According to another aspect of the invention, a maximum weld wire feed rate for the process selected by the operator is set at the welding machine. The feed rate as set by the thumbwheel 69 is from a minimum to the maximum value set at the welding machine. In that manner, the optimum feed rate is easily set and maintained, because the thumbwheel becomes a fine tuning control.

Further in accordance with the present invention, atmospheric air present in the liner 61 is blocked by a gas seal from reaching the weld wire 14 at the workpiece. Turning to FIGS. 6–8, the gas seal 72 is built into a nozzle assembly 73 that is assembled to the end of the head tube 15. The specific construction and operation of the gas seal 72 will be described shortly. The nozzle assembly 73 is comprised of a nozzle 85, a nozzle adapter 83, and a nozzle adapter lock nut 82 that are retained on the outer portion of the head tube by a tubular fitting 80. The NOZZLE ASSEMBLY is insulated by a tubular insulator 76 from an electrically hot conductor 78. The conductor 78 conducts welding power from the gun handle 3 to a diffuser 77. Accordingly, the diffuser 77 is also electrically hot. Another insulator 75 is supported by the diffuser 77 to separate the electrically hot conductor 78 and diffuser 77 from the electrically cold head tube, fitting 80, nut 82, nozzle adapter 83, and nozzle 85. A contact tip 79 is connected to the diffuser 77 by a nut 81. The contact tip 79 and nut 81 are electrically hot. The contact tip transmits the welding electrical power from the diffuser 77 and the conductor 78 to the weld wire 14. In other embodiments, the contact tip 79 may be screwed into the diffuser 77, especially as shown in U.S. Pat. No. 5,760,373 commonly assigned and incorporated herein. The nozzle assembly 73, being threaded to the outer portion of the head tube, surrounds the insulator 75, diffuser 77, contact tip 79, and nut 81, to form a space 107.

The liner 61 extends from near the feed rollers 47 and 53 (FIG. 5) to a bore 86 in the diffuser 77. The weld wire 14 passes through the interior 87 of the liner 61. Preferably, there is a frusto-conical chamfer surface 89 at the downstream end of the liner.

The bore 86 of the diffuser 77 is made of several sections. A first section 91 is a frusto-conical surface of the same geometry as the chamfer 89 of the liner 61. The liner chamfer 89 abuts the diffuser surface 91 to locate the liner relative to the diffuser. The apex end of the diffuser frusto-conical locating surface 91 terminates in a short modified cylindrical surface 92. See FIG. 8. From the cylindrical surface 92, the diffuser bore 86 opens at a radial surface 104 to receive the outer diameter 94 of the contact tip 79. The contact tip has a hole 98 through it. The weld wire 14 passes through the contact tip hole 98.

In the illustrated construction, there is a short modified cylindrical surface 93 (see FIG. 7) between the diffuser locating surface 91 and an enlarged inner diameter 95. An angled surface 106 connects the enlarged inner diameter 95 with the modified cylindrical surface 93. The diffuser inner diameter 95 cooperates with the liner outer diameter 102 to form a relatively large chamber 97. One or more radial holes 100 extend through the diffuser wall 103 from the inner diameter 95 to the diffuser outer surface 105. The diffuser has a smaller inner diameter 99 that surrounds the liner and cooperates with it to form a relatively long passage 101.

In conventional operation, the arc 108 between the weld wire 14 and the workpiece WP is shielded from most atmospheric air. The shield is provided by an inert gas supplied from the welding machine through the flexible cable 13 (FIG. 1) to the handle 3 and the head tube 15. The inert gas is under a pressure greater than atmospheric pressure. The inert gas is directed by tubing not illustrated in the drawings to the bore 86 of the diffuser 77. The gas flows through the passage 101 to the chamber 97, out the radial holes 100, and into the space 107. From the space 107, the inert gas flows out the open end of the nozzle 85 to surround the welding arc 108.

However, atmospheric air is present in the interior 87 of the liner 61. The atmospheric air enters the liner interior at the liner inlet 59 (FIG. 5). From the liner, the air flows through the hole 98 in the contact tip 79 to the arc 108. The inert gas from the nozzle 85 cannot shield the arc from the air that flows through the contact tip hole.

It is the gas seal 72 of the invention that blocks atmospheric air in the liner 61 from reaching the arc 108 through the contact tip hole 98. That is achieved by bleeding some of the inert gas in the diffuser chamber 97 through a passage that communicates with the interior 87 of the liner 61. The pressure of the inert gas in the liner interior blocks atmospheric air in the liner interior upstream of the gas seal from flowing in the downstream direction 63 into the contact tip hole.

In one embodiment, the gas seal 72 comprises a sealing space 88 between the end 90 of the liner 61 and the end 84 of the contact tip 79. The weld wire is unsupported within the sealing space 88. The gas seal bleeds inert gas from the diffuser chamber 97 through a passage to the liner interior 87 by way of the sealing space 88. The passage of the gas seal is in the form of at least one and preferably more slots 109 in the diffuser 77 between the chamber 97 and the sealing space 88. As illustrated, there are three slots 109. Each slot is made through the diffuser surfaces 91 and 93 and extends from the angled surface 106 to the radial surface 104. In that manner, the chamber 97 is in communication with the sealing space 88 through the slots 109. Other than through the slots 109, the contact of the liner chamfer 89 with the diffuser locating surface 91 prevents communication between the chamber 97 and the sealing space 88.

As noted, inert gas is in the chamber 97. In addition to flowing out the radial holes 100, some of the inert gas bleeds through the slots 109 to the sealing space 88. Since the inert gas has a higher pressure than atmospheric, the gas tends to flow upstream into the interior 87 of the liner 61. That action blocks any air in the liner interior from reaching the sealing space 88. Consequently, substantially no air can flow downstream from the sealing space 88 through the contact tip hole 98 to the arc 108. Some of the inert gas will also flow downstream from the sealing space 88 into the contact tip hole, thereby providing an even more effective blockage to any air that might reach the sealing space 88. The result is that the welds of the workpiece are substantially free from sooty deposits.

FIG. 9 shows a modified gas seal 111. An electrically hot diffuser 113 has a bore 86' with frusto-conical locating surface 91'. A contact tip 79' is connected to the diffuser 113. The diffuser further has a chamber 97' defined by an enlarged inner diameter 95', which connects to the locating surface 91' by an angled surface 106' and a cylindrical surface 93'. Radial holes 100' extend through the diffuser wall 103' from the inner diameter 95' to the diffuser outer surface 105'.

A liner 115 is inside the diffuser 113. The liner 115 has a wall 116 defined by an outer diameter 102' and an interior 87'. A frusto-conical surface on the end surface 89' of the liner 115 abuts against the diffuser locating surface 91'. The liner outer diameter 102' cooperates with the diffuser bore 86' to form a long passage 101'. There are one or more radial holes 117 through the liner wall 116. Preferably, the radial holes 117 are approximately in the same plane as the radial holes 100' in the diffuser.

In operation, the inert gas flows through the passage 101' to the diffuser chamber 97'. Most of the inert gas flows from the chamber 97' out the radial holes 100' and into the nozzle space 107'. However, some of the inert gas bleeds inwardly through the liner holes 117 to the interior 87' of the liner 115. The pressure of the inert gas in the liner interior 87' blocks atmospheric air in the liner interior upstream of the holes 117 from flowing in the downstream direction 63' toward the contact tip 79'. Some of the inert gas also flows downstream from the holes 117 toward the contact tip, thereby providing an even more effective barrier against atmospheric air that might otherwise reach the contact tip.

Thus, it is apparent that there has been provided, in accordance with the invention, a mig gun with axially aligned offset motor that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A mig gun comprising:
  a. a handle having a first section with a tubular wall for holding by a person's hand and defining a first longitudinal axis and having an underside, and a second section that defines a second longitudinal axis, the first and second longitudinal axes intersecting at a predetermined acute angle;
  b. a head tube projecting from the handle second section; and
  c. means for pulling a weld wire from a welding machine to the handle and for pushing the weld wire out the head tube to a welding arc between the weld wire and a workpiece, the acute angle between the handle first and second sections enabling the person to comfortably maneuver his hand and wrist and the gun through a multiplicity of spacial orientations during welding operations on the workpiece, wherein the means for pulling a weld wire comprises:
    i. a motor in the handle having an armature with an axial centerline that is generally parallel to the handle first longitudinal axis;
    ii. at least one feed roller rotatable about an axes of rotation that is perpendicular to the handle second longitudinal axis, the feed roller gripping the weld wire to pull it in a downstream direction to the gun from the welding machine when the feed roller rotates; and
    iii. means for rotating the feed roller in response to energization of the motor.
2. The mig gun of claim 1 wherein the means for pulling a weld wire comprises:
  a. a motor in the handle having an armature with an axial centerline that is generally parallel to the handle first longitudinal axis;

b. first and second feed rollers rotatable about respective first and second axes of rotation that are each perpendicular to the handle second longitudinal axis, the feed rollers gripping the weld wire to pull it in a downstream direction to the gun from the welding machine when the feed rollers rotate; and c. means for rotating the feed rollers in response to energization of the motor.

3. The mig gun of claim 2 wherein the means for rotating the feed rollers comprises:

a. a pinion rotated by the motor armature about an axial centerline parallel to the first longitudinal axis;

b. a first gear meshing with the pinion and fastened to the first feed roller for rotating therewith about the first axis of rotation; and c. means for rotating the second feed roller about the second axis of rotation in response to rotation of the first gear, so that energization of the motor causes the pinion to rotate the first gear and the feed rollers to thereby pull the weld wire.

4. The mig gun of claim 1 further comprising a guide for the weld wire, the guide having a first section that is generally parallel to the first longitudinal axis and located between the motor and the first section tubular wall, and an outlet proximate the feed roller, the outlet defining a longitudinal axis that is concentric with the second longitudinal axis.

5. The mig gun of claim 1 wherein:

a. the head tube comprises:

i. a liner having an interior that receives the weld wire, a first end at the gun handle, and a second end, atmospheric air being present in the liner interior;

ii. a diffuser having a bore that receives the liner second end and that receives inert gas from the welding machine, the diffuser bore having a chamber that surrounds the liner between the first and second ends thereof; and iii. a contact tip connected to the diffuser and having a hole that receives the weld wire, the contact tip, the liner second end, and the diffuser cooperating to define a sealing space that surrounds the weld wire and that is substantially in non-communication with the diffuser chamber; and b. the mig gun further comprises a gas seal comprising means for bleeding the inert gas from the diffuser chamber to the sealing space to block atmospheric air in the liner interior from reaching the sealing space and the hole in the contact tip, so that the atmospheric air cannot flow through the hole in the contact tip to reach the welding arc.

6. The mig gun of claim 5 wherein:

a. the liner second end has an end surface of a selected first geometry;

b. the diffuser bore has a locating surface of a second geometry that is complementary to the first geometry, the diffuser bore locating surface cooperating with the liner end surface to locate the liner second end relative to the diffuser; and c. the diffuser is formed with at least one passage through the diffuser bore locating surface between the chamber and the sealing space that enables the inert gas in the chamber to bleed from the chamber to the sealing space.

7. The mig gun of claim 6 wherein said at least one passage is in the form of a slot that extends through the diffuser bore locating surface between the chamber and the sealing space.

8. The mig gun of claim 6 wherein said at least one passage is in the form of a plurality of slots that extend through the diffuser bore locating surface between the chamber and the sealing space.

9. The mig gun of claim 1 wherein:

a. the head tube comprises:

i. a liner having an interior that receives the weld wire, a first end at the gun handle, and a second end, atmospheric air being present in the liner interior;

ii. a diffuser having a bore that receives the liner second end and that receives an inert gas from the welding machine; and iii. a contact tip connected to the diffuser and having a hole that receives the weld wire; and b. the mig gun further comprises a gas seal comprising means for bleeding the inert gas from the diffuser bore into the liner interior at a location between the liner first and second ends, so that the inert gas in the liner interior blocks the atmospheric air therein from flowing through the contact tip hole to the welding arc.

10. The mig gun of claim 9 wherein:

a. the liner comprises a wall defined by the liner interior and a liner outer diameter; and b. the means for bleeding the inert gas comprises at least one hole through the liner wall proximate the liner second end, the inert gas bleeding from the diffuser bore to the liner interior through said at least one hole through the liner wall.

11. A mig gun comprising:

a. a handle having a first section for holding by a person's hand and defining a first longitudinal axis and having an underside, and a second section that defines a second longitudinal axis, the first and second longitudinal axes intersecting at a predetermined acute angle;

b. a head tube protecting from the handle second section; and c. means for pulling a weld wire from a welding machine to the handle and for pushing the weld wire out the head tube to a welding arc between the weld wire and a workpiece, the acute angle between the handle first and second sections enabling the person to comfortably maneuver his hand and wrist and the gun through a multiplicity of spacial orientations during welding operations on the workpiece, wherein the means for pulling a weld wire comprises:

i. a motor in the handle first section and having an armature with an axial centerline that is generally parallel to the handle first longitudinal axis;

ii. at least one feed roller in the handle second section rotatable about an axis of rotation that is perpendicular to the handle second longitudinal axis, the feed roller gripping the weld wire to pull it in a downstream direction to the gun from the welding machine when the feed roller rotates; and iii. means for rotating the feed roller in response to energization of the motor.

12. The mig gun of claim 11 wherein the predetermined acute angle is approximately 20 degrees.

13. The mig gun of claim 1 wherein the motor axial centerline intersects the feed roller axis of rotation at an angle of approximately 70 degrees.

14. A mig gun comprising:

a. a handle having a first section for holding by a person's hand and defining a first longitudinal axis and having an underside, and a second section that defines a second longitudinal axis, the first and second longitudinal axes intersecting at a predetermined acute angle;

b. a head tube protecting from the handle second section;

c. means for pulling a weld wire from a welding machine to the handle and for pushing the weld wire out the head tube to a welding arc between the weld wire and a workpiece, the acute angle between the handle first and second sections enabling the person to comfortably maneuver his hand and wrist and the gun through a multiplicity of spacial orientations during welding operations on the workpiece; and d. a thumbwheel rotatable in the handle first section, the thumbwheel being located on an underside of the handle first section whereat the thumbwheel is accessible to a first hand of the person holding the handle first section with his second hand whether the person holds the handle first section with his right hand or his left hand.

15. In combination with a gas metal arc welding machine, a gun for producing an arc between a weld wire and a workpiece comprising:

a. a handle comprising:
   i. a first section held by a first hand of a person and defining a first longitudinal axis; and
   ii. a second section defining a second longitudinal axis that intersects the first longitudinal axis at a predetermined acute angle;

b. a non-right angle gear set comprising:
   i. a pinion that rotates about an axial centerline parallel to the first longitudinal axis; and
   ii. a gear that meshes with the pinion and rotates about an axis of rotation perpendicular to the second longitudinal axis; and c. means for pulling the weld wire at a selected feed rate from the welding machine in response to rotation of the gear set.

16. The combination of claim 15 wherein the means for pulling the weld wire comprises:

a. a motor having an axial centerline parallel to the pinion axial centerline, the pinion rotating in response to energization of the motor;

b. at least one feed roller that grips the weld wire and that rotates about an axis of rotation that is parallel to the gear axis of rotation; and c. means for rotating the feed roller to pull the weld wire in response to rotation of the pinion.

17. In combination with a gas metal arc welding machine, a gun for producing an arc between a weld wire and a workpiece comprising:

a. handle comprising:
   i. a first section held by a first hand of a person and defining a first longitudinal axis; and
   ii. a second section defining a second longitudinal axis that intersects the first longitudinal axis at a predetermined acute angle;

b. a non-right angle gear set comprising:
   i. a pinion that rotates about an axial centerline parallel to the first longitudinal axis; and
   ii. a gear that meshes with the pinion and rotates about an axis of rotation perpendicular to the second longitudinal axis;

c. means for pulling the weld wire at a selected feed rate from the welding machine in response to rotation of the gear set; and d. means for adjusting the selected weld wire feed rate with a second hand of the person without the person having to release the hold of the handle with his first hand regardless of whether the person holds the handle with his right or his left hand, wherein the means for adjusting the weld wire feed rate comprises a thumbwheel located proximate the center of an underside of the handle, the thumbwheel being accessible to the left hand of a person holding the handle with his right hand, the thumbwheel being accessible to the right hand of a person holding the handle with his left hand.

18. A gas metal arc welding gun for producing an arc between a workpiece and a weld wire supplied by a welding machine, the welding gun comprising a liner with upstream and downstream ends and comprising a wall with an interior that guides the weld wire in a downstream direction, the liner interior containing atmospheric air that flows therethrough in the downstream direction; a diffuser having first and second ends with a bore that receives the liner, the liner and the diffuser bore cooperating to define an annular first passage therebetween that receives an inert gas entering the annular first passage at the diffuser second end and flowing in the downstream direction from the welding machine; a contact tip connected to the diffuser first end and having a hole that guides the weld wire from the liner interior to the workpiece; a nozzle that directs the inert gas from the annular first passage to form a shield that surrounds the arc; and a gas seal that blocks atmospheric air in the liner interior from flowing through the hole in the contact tip to the arc inside the shield of inert gas from the nozzle.

19. The gas metal arc welding gun of claim 18 wherein the gas seal comprises at least one second passage that communicates between the annular first passage and the liner interior to bleed inert gas into the liner interior and thereby block the atmospheric air therein from reaching the hole in the contact tip.

20. The gas metal arc welding gun of claim 19 wherein said at least one second passage is defined by at least one hole through the liner wall that communicates between the annular first passage and the liner interior.

21. The gas metal arc welding gun of claim 18 wherein:

a. the diffuser, liner downstream end, and the contact tip cooperate to define a sealing space that surrounds the weld wire and that is substantially blocked from communicating with the annular first passage; and b. the gas seal comprises at least one second passage that bleeds inert gas from the annular first passage to the sealing space to enable the inert gas in the sealing space to flow in an upstream direction into the liner interior.

22. The gas metal arc welding gun of claim 21 wherein:

a. the diffuser bore defines a locating surface that is in locating contact with the downstream end of the liner; and b. said at least one second passage comprises at least one slot that extends through the diffuser bore locating surface between the annular first passage and the sealing space.

23. A method of gas metal arc welding comprising the steps of:

a. feeding a weld wire in a downstream direction through a liner having a wall, a downstream end, and an interior, the liner interior having atmospheric air therein;

b. providing an annular first passage between the liner and a diffuser bore;

c. substantially blocking the annular first passage at the downstream end of the liner by locating the downstream end of the liner against the diffuser bore;

d. connecting a contact tip to the diffuser, the contact tip having a hole therethrough that guides the weld wire from the liner to a welding arc;

e. shielding the welding arc from atmospheric air with a shield of inert gas that is received in the annular first passage and flows therefrom out a nozzle and surrounds the arc; and f. bleeding the inert gas from the annular first passage to the liner interior and thereby blocking the atmospheric air therein from reaching the contact tip hole, so that the atmospheric air in the liner interior does not flow through the contact tip hole to the arc.

24. The method of claim 23 wherein:

a. the step of locating the downstream end of the liner against the diffuser bore comprises the steps of:
 i. providing a locating surface on the diffuser bore; and
 ii. contacting the downstream end of the liner against the diffuser bore locating surface; and b. the step of bleeding the inert gas comprises the step of bleeding the inert gas from the annular first passage to the interior of the liner through the diffuser bore locating surface.

25. The method of claim 23 wherein:

a. the step of connecting a contact tip comprises the step of defining a sealing space surrounding the weld wire between the diffuser, liner, and the contact tip; and b. the step of bleeding the inert gas comprises the steps of:
 i. bleeding the inert gas from the annular first passage to the sealing space; and
 ii. flowing the inert gas in the sealing space in an upstream direction into the liner interior and thereby blocking the atmospheric air therein from reaching the sealing space.

26. The method of claim 25 wherein:

a. the step of providing an annular first passage comprises the step of providing the diffuser bore with a locating surface;

b. the step of locating the downstream end of the liner in the diffuser bore comprises the step of contacting the downstream end of the liner against the diffuser bore locating surface; and c. the step of bleeding the inert gas comprises the step of bleeding the inert gas from the annular first passage through the diffuser bore locating surface to the sealing space.

27. The method of claim 23 wherein the step of bleeding the inert gas comprises the steps of:

a. forming at least one hole through the liner wall proximate the downstream end of the liner; and b. bleeding the inert gas from the annular first passage through said at least one hole through the liner wall to the liner interior.

\* \* \* \* \*